Jan. 13, 1970     W. E. ZIMMERMAN     3,488,995
LOW CONSISTENCY SENSOR
Filed June 24, 1968

INVENTOR.
WILLIAM E. ZIMMERMAN
BY
Thomas W. Flynn

United States Patent Office 3,488,995
Patented Jan. 13, 1970

3,488,995
LOW CONSISTENCY SENSOR
William E. Zimmerman, Covington, Va., assignor to Westvaco Corporation, New York, N.Y., a corporation of Delaware
Filed June 24, 1968, Ser. No. 739,394
Int. Cl. G01n *11/14*
U.S. Cl. 73—59                                      6 Claims

ABSTRACT OF THE DISCLOSURE

A torque type consistency measuring device is adapted to measure low consistency suspensions, such as papermaking stock at consistencies below 1%, by utilizing a sensing element which consists of a spindle with a series of wire-like extensions projecting outwardly from the spindle.

BACKGROUND OF THE INVENTION

Field of the invention

The testing of the internal resistance, e.g. viscosity, of a liquid or a liquid suspension of solids by force reaction to a member driven therein.

Description of the prior art

There are several commercially available devices which attempt to measure the consistency of a liquid or liquid suspension of solids by measuring the torque resistance to a member driven therethrough.

For example, one well known consistency measuring device is the Brookfield Viscometran, in which a spindle is hung from a jewel pivot bearing and rotated at a constant speed through a beryllium copper spring. The degree to which the spring is wound up (the angle through which its free end is deflected) is proportional to the torque required to maintain rotation, which in turn is proportional to absolute viscosity. A capacitance, resistance or pneumatic pickup is used to detect this deflection.

While consistency measuring devices of this type have gained a great deal of acceptance, it will be obvious that the readings obtained from the torque type consistency measuring devices will be greatly influenced by the configuration of the member which is rotated in the liquid or liquid suspension of solids. As a result, attention has been directed to designing a member which is highly sensitive to changes in viscosity and hence, consistency, but yet is relatively uninfluenced by other factors such as temperature, flow rates, etc. For example, in some installations a smooth surfaced spindle is used while in others a similar spindle having grooves running longitudinally of its surface has been found suitable. Additionally, and as more fully described in the patent to Ostroot, 3,285,058, discs and outwardly projecting rods, as well as variations of one and both of these two configurations have also been tried. In applicant's experience, however, the measurement of very small changes in consistency, especially in low consistency suspensions, has continued to prove difficult. This is of great importance in the papermaking process, where the consistency of the papermaking stock suspension is often at 1% or less, and changes of a few hundredths of 1% consistency can have an appreciable effect on the basis weight of the paper produced and should, therefore, be carefully controlled.

SUMMARY OF THE INVENTION

The present invention provides an accurate measurement of low consistency suspensions by utilizing, as sensing means, a plurality of fine wire-like extensions which are moved through the suspension of papermaking stock or the like to give extremely accurate readings.

While prior art devices which used projecting rods, spindles, discs, and the like, attempted to measure the torque reaction or viscosity of the liquid or the suspension as a whole, it is believed that with the present invention the individual projecting wires transmit a torque reaction by actually striking the individual fibers as the wires are moved through the suspension. While it has been theorized that the sensitivity of rod type sensors could be increased by reducing the diameter of the rods. it has further been felt that this approach was impractical because of strength limitations on the sensors themselves and because the fibers would build up and break away on the rods, causing erratic readings, and/or permanently build up on the rods giving them a larger, indeterminate diameter than that for which the torque reading instruments were designed. (See for example, the above mentioned patent to Ostroot).

Applicant has found however, that if the diameter of the projecting, sensing elements is greatly reduced, that is, if wires rather than rods are used, the undesirable results that were contemplated do not materialize. Thus, when using a wire-like sensing element the weight to strength ratio is such that no structural problems are present. Additionally, possible because the small mass sensor elements tend to vibrate while being rotated through the suspension, fiber build up, whether of the permanent or intermittent type, does not develop. At the same time, the very small diameter sensing elements give extremely accurate fine scale readings.

DESCRIPTION OF THE PREFERRED EMBODIMENTS

Figure 1:
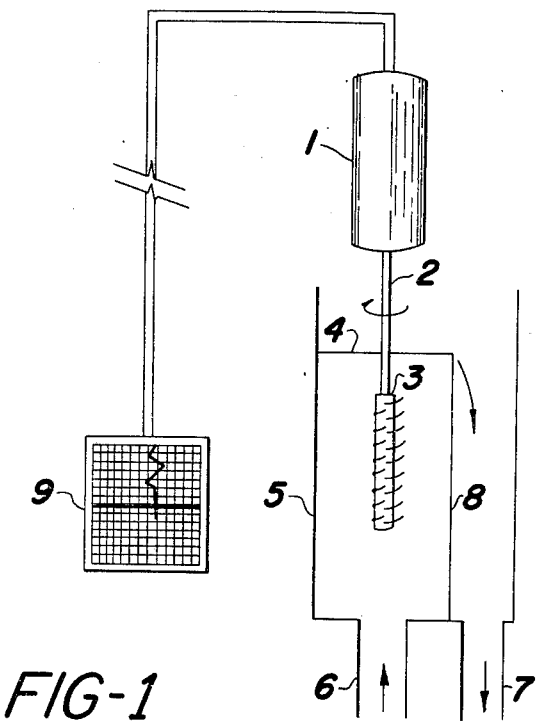
FIGURE 1 shows, somewhat schematically and partially in cross section, apparatus embodying the present invention for continuously measuring the viscosity or consistency of a liquid or a liquid suspension of solids.

Turning first to FIGURE 1 of the drawings, a typical installation in which the present invention may be utilized is somewhat schematically shown. As seen in FIGURE 1, a housing 1 contains appropriate mechanism for rotating the shaft 2 and detecting the resistance to rotation imposed upon the sensing mechanism 3 by the liquid or liquid suspension of solids 4 which is continuously circulated through the chamber 5 by means of the inlet pipe 6 and outlet pipe 7. As previously indicated, the mechanism in housing 1 may be a Brookfield Viscometran or any similar torque type consistency measuring device. A weir 8 is also provided to maintain the liquid level in the chamber 5 at the desired height. If desired, the indications from the consistency measuring equipment can be transmitted to a recording instrument, as at 9, to give a constant trace and record of the consistency of the liquid or suspension passing through chamber 5. Alternatively, of course, the signal from the consistency measuring device could be transmitted directly to control mechanism or control mechanism could be incorporated in the system in addition to the recorder 9. As will also be apparent to those skilled in the art, the chamber 5 and associated conduits 6 and 7 will ordinarily be placed in a liquid circuit parallel to the main stock flow directed to, for example, the slice assembly of a paper machine headbox.

Figure 2:
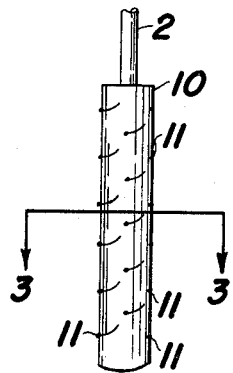
FIGURE 2 shows the sensing means of FIGURE 1 enlarged for purposes of clarity.
Figure 3:
FIGURE 3 is a cross section of the sensing means of FIGURE 2 taken on line 3—3 of FIGURE 2.
Figure 4:
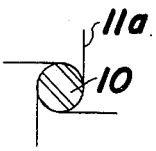
FIGURE 4 shows a second preferred embodiment of the present invention.

With reference now to FIGURE 2 of the drawings, the sensing means indicated by the reference numeral 3 in FIGURE 1 will be described in more detail. As seen in FIGURE 2, a spindle 10 is mounted on the end of the rotatable shaft 2 and has a plurality of fine wire sensors 11 attached thereto and projecting outwardly from its surface. As best seen in FIGURE 3, the sensors 11 extend somewhat tangentially of the circumference of the spindle 10 with a swept-back design to provide a self cleaning configuration. In this regard, it will also be noted that the sensors are curved upwardly as seen in FIGURES 1 and 2 in the direction of flow to also provide better cleaning action for the sensors 11. While the upward circumferential sweep of the sensor elements 11 materially assists in preventing fiber build up, it is believed that because of the relatively fine diameter of the sensor elements there is a tendency for the elements to vibrate as they are moved through the liquid suspension and thereby prevent a concentration of fibers thereon. For this reason, the construction of FIGURES 1-3 can be somewhat simplified in many installations, particularly those wherein a suspension of fairly short fibers is involved, by merely utilizing a plurality of relatively straight sensor elements 11a projecting tangentially from the spindle 10.

While the flow through the chamber 5 is, as indicated by the arrows, upwardly, it will be apparent that this specific direction relative to the sensing mechanism is not essential and could be in any other convenient direction. It should be noted however, that apparently because the torque readings result from the individual sensor elements 11 or 11a contacting the individual fibers in suspension, it is important that the suspension flow through the chamber 5 be at sufficient velocity to insure turbulence and thus prevent flocculation of the fibers of suspension.

As noted above, the sensor elements should be of fairly fine, wire-like configuration rather than the projecting rods of the prior art. In this regard, it has been found that the sensor elements should have a diameter of less than thirteen thousandths of an inch (.013") and in a suspension of predominantly long fiber pulp a diameter of five thousandths of an inch (.005") has been found optimum.

While a specific embodiment of the invention has been described for purposes of illustration it will be apparent that modifications thereof will be obvious to those skilled in the art.

I claim:
1. In a torque type consistency measuring device wherein a member is driven in the liquid mixture whose consistency is to be measured and including a sensing means for sensing the reaction of the member being driven, the improvement comprising:
 (a) a spindle of appreciable length; and
 (b) a plurality of sensors attached to said spindle both longitudinally and peripherally thereof, said sensors being flexible wires extending outwardly from said spindle.
2. The apparatus of claim 1 wherein:
 (a) said sensors extend approximately tangentially of said spindle.
3. The apparatus of claim 2 wherein:
 (a) the distal portions of said sensors are curved inwardly toward said spindle.
4. The apparatus of claim 3 wherein:
 (a) said sensors are oriented at an angle of less than ninety degrees with respect to the axis of said spindle.
5. The apparatus of claim 4 wherein:
 (a) said sensors are less than thirteen thousandths of an inch in diameter.
6. The apparatus of claim 5 wherein:
 (a) said sensors are approximately five thousandths of an inch in diameter.

References Cited

UNITED STATES PATENTS

| 2,171,312 | 8/1939 | Meyers | 73—59 X |
| 3,285,058 | 11/1966 | Ostroot | 73—59 |
| 3,298,190 | 1/1967 | Harker | 73—59 X |

LOUIS R. PRINCE, Primary Examiner

J. W. ROSKOS, Assistant Examiner